Oct. 8, 1940.   W. R. MICHAEL   2,216,979
DOWEL PIN CAP
Filed Nov. 15, 1939
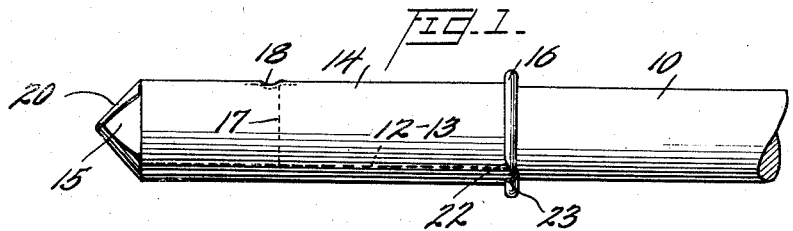
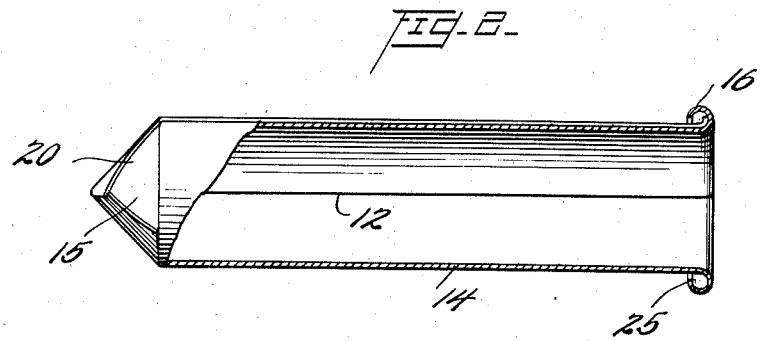
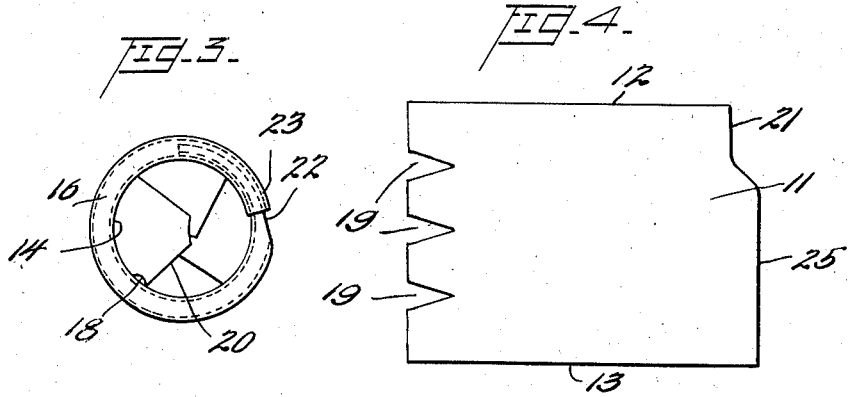
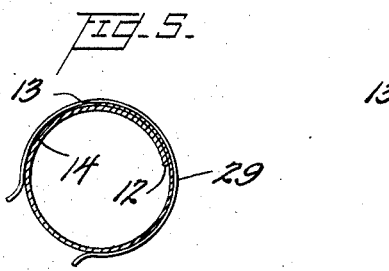
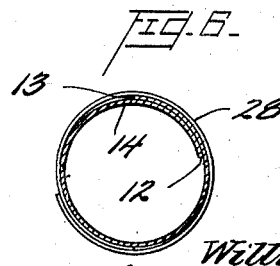
Inventor
Willis R. Michael,
By Henry H. Snelling
Attorney Patented Oct. 8, 1940

2,216,979

UNITED STATES PATENT OFFICE 2,216,979

DOWEL PIN CAP

Willis R. Michael, Red Lion, Pa.

Application November 15, 1939, Serial No. 304,629

7 Claims. (Cl. 94—8)

This invention relates to dowel caps and has for its principal object the provision of an improved cap for use with dowel pins, bars, or rods. While the dowel cap of this invention will doubtless have its principal use in connection with compensating for the contraction and expansion of concrete slabs and holding such slabs in secure alinement to insure even surfaces at the joints between the slabs, it is not limited to this particular function and may be used wherever a dowel pin or bar needs provision for linear expansion.

One of the main objects of the invention is to increase the effective bearing surface of the dowel, thereby permitting the use of a shorter dowel or alternatively providing a better bearing for the same length of dowel pin. This object of the invention is secured by having the dowel cap tightly fit the dowel rod, the cap preferably being somewhat smaller in diameter at its open end than is the dowel which it is to cap.

Dowel caps have been used for years, the earliest being simple tubes, the ends of which were closed in any convenient way or sometimes actually left unclosed, the sleeve being of such length as to insure some space being left for expansion after the concrete had penetrated into the tube. Later these tubes were formed closed at one end, usually by a tight fitting cover or head plate and sometimes by bending the sleeve.

When a tube is seamless it obviously cannot fit a round dowel pin or rod and it has previously been proposed to form the tubular portion of the dowel cap from rolled sheet material, leaving an unsealed seam the overlapping ends of which can slide on one another and which is supposed to be pressed tightly against the dowel by the pressure of the imbedded material, usually concrete. Unfortunately, this hope is not realized and particularly now that concrete is poured so much more free flowing than previously, the seam will open and the concrete will enter the sleeve or cap, defeating the very purpose for which the cap was intended.

One object of my present invention is to provide a dowel cap which is capable of extending in diameter to receive the dowel rod but is prevented from opening at the seam, the increase in diameter being formed solely by sliding of the ends so the tube can increase in periphery. Among the various means to secure this desirable end are the use of a narrow spring element completely encircling the tube to prevent separation of the lapped ends of the side seam, a spring clip which can be forced on the dowel cap near the end by merely pushing it radially of the tube, and preferably by providing a flange at the open end of the cap so that one end may telescope with the other end of the flange, one portion of the flange encircling the other portion, thus providing an absolute assurance against opening of the lapped seam because of the inability of the outer lap edge to move radially with respect to the inner lap.

Inasmuch as the dowel cap of the present invention is not limited to any specific form or use of dowel no illustration is made of any of the many methods of holding the dowel in place in the concrete or other imbedding material.

In the drawing:

Figure 1 is a view of my cap associated with a dowel.

Figure 2 is a section through the dowel.

Figure 3 is an end view of the dowel.

Figure 4 illustrates the blank from which my preferred form of dowel is fashioned.

Figure 5 shows a modified form of means for preventing radial movement of the lapped ends of the sleeve.

Figure 6 is similar to Figure 5 but shows a modified clip.

The dowel 10 is illustrated as a round rod as ordinarily used in concrete highway construction, this being a bar of low cost metal, having an appreciable mill tolerance usually about a sixty-fourth of an inch for the common three-quarter inch dowel.

The cap is preferably formed from a blank 11 of full hard, cold rolled steel sheet for while this is much more expensive than the material ordinarily used it provides a superior cap. The edges 12 and 13 are lapped as shown in the figures forming a tube 14, which may be cylindrical but is preferably tapered, being smallest at its open end. The other end is closed in any desired manner as at 15, and at the open end there is shown a rolled flange or bead 16. The dowel bar 10 fits snugly within the cap throughout its area of contact extending to the dotted line 17 where the end of the dowel pin engages a stop 18 preferably diametrically opposite the middle of the lapped side seam. The stop 18 may be of any desired form, being for an old and well known function, altho I much prefer a mere indentation to the striking inward of the metal to form a stop that will be sheared upon expansion of the dowel. The closed end 15 may be a head or cover or plug but is preferably integral with the tube 14 and in its preferred form is fashioned by cutting away the metal blank in a plurality of notches 19 and then folding as shown at 20 to form a neat but concrete leakproof end.

As best seen in Figure 4 a portion of the blank 11 is cut away at one corner as at 21, thus forming a reduced portion 22 of the flange so that this portion 22 will have a snug sliding fit with the opposite curled end 23 of the flange or bead. The telescoping of these two portions and the lapped seam permits enlargement of the diameter of the tube 14 but insures against any opening of the side seam because the inner lapped portion is barred from any inward movement with respect to the outer lapped portion and this in turn prevents entry of the concrete by movement of the edge 13 away from the underlying metal of the tube.

The degree of lapping is a matter of choice between a minimum of about 35° or a tenth of the closed tube periphery and a maximum of a third of such periphery, a preferred amount of lapping being about one-fifth so that the angle between the ends 12 and 13 will be roughly 75° at the axis of the tube. The rolled flange or bead 16 may be quite short axially as shown and its edge 25 need only prevent upward movement of the reduced portion 22 altho it is preferred that it shall extend farther as illustrated, thus making a smoother finish.

In Figure 6 the tube 14 is completely encircled by a narrow spring band 28 the ends of which lap appreciably but I prefer the simple spring clip 29 of Figure 5 as this may be applied after the cap is fitted over the dowel. In either case the spring member yieldingly resists sliding of the lapped ends of the tube while effectively preventing radial movement of the outer edge 13 away from the proximate outer surface of the tube.

Altho it should be distinctly borne in mind that the specific dimensions of the various parts form no part of the invention and the claims are to be considered as limited solely by their expressed limitations, the following figures are given as being my chosen dimensions for concrete dowel caps. I find it advisable to make a cap for a three-quarter inch dowel for example, of a length of about 3¼", the nose or closed end being a quarter of an inch and the stop 18 being two inches from the open end. The bead may have an axial length of a sixteenth of an inch and a radial length of an eighth of an inch so the largest diameter will be slightly more than an even inch. The inside diameter adjacent the stop 18 is the same as that of the round rod while at the open end the diameter is somewhat smaller, being a generous thirty-second of an inch less and the lap may be about five-eighths of an inch.

What I claim is:

1. A spring metal dowel cap comprising a sheet bent to form a tube with a lapped side seam, a closed end, and a normal inside diameter at its open end less than that of its closed end, and resilient means capable of expanding circumferentially at the open end of the cap to increase the sliding friction between the lapped ends of the side seam as the cap is expanded as in receiving a dowel and to prevent radial separation of the edge of the outer lapped end from the adjacent outer surface of the tube.

2. A spring metal dowel cap comprising a sheet bent to form a tube with a lapped side seam, a closed end, and a normal inside diameter at its open end less than that of its closed end, a bead integral with the tube at the open end of the cap, said bead having overlapping ends which have a telescoping engagement with one another, to increase the sliding friction between the lapped ends of the side seam as the cap is expanded as in receiving a dowel and to prevent radial separation of the edge of the outer lapped end from the adjacent outer surface of the tube.

3. A spring metal dowel cap comprising a sheet bent to form a tube with a lapped side seam, a closed end, and a normal inside diameter at its open end less than that of its closed end, a spring clip encircling the tube, to increase the sliding friction between the lapped ends of the side seam as the cap is expanded as in receiving a dowel and to prevent radial separation of the edge of the outer lapped end from the adjacent outer surface of the tube.

4. A spring metal dowel cap comprising a lapped tube and an integral curled flange, one end of the flange being reduced to facilitate telescoping within the other end of the flange but snugly fitting against radial movement whereby to prevent an opening of the lapped seam as the cap expands to receive a dowel.

5. A dowel cap comprising a single sheet forming a tube having a lapped side seam, a flange on the end of said tube, said flange having its ends overlapped.

6. An integral sheet metal dowel cap comprising a lapped side seam, contractible, tapered tube having a closed end, the diameter of the tube being greater near its closed end than at its open end, and resilient means capable of expanding circumferentially to increase the sliding friction between the lapped ends of the side seam.

7. A spring steel sheet metal cap for a round dowel rod, comprising a lapped side seam tube, means for preventing increase of diameter at one end and circumferentially-expanding means resisting increase of diameter at the other end, said means being contractable to firmly grip the round dowel rod.

WILLIS R. MICHAEL.